US007062085B2

(12) United States Patent
Luo et al.

(10) Patent No.: US 7,062,085 B2
(45) Date of Patent: Jun. 13, 2006

(54) METHOD FOR DETECTING SUBJECT MATTER REGIONS IN IMAGES

(75) Inventors: Jiebo Luo, Pittsford, NY (US); Amit Singhal, Scottsville, NY (US)

(73) Assignee: Eastman Kodak Company, Rochester, NY (US)

( * ) Notice: Subject to any disclaimer, the term of this patent is extended or adjusted under 35 U.S.C. 154(b) by 989 days.

(21) Appl. No.: 09/951,256

(22) Filed: Sep. 13, 2001

(65) Prior Publication Data

US 2003/0053686 A1 Mar. 20, 2003

(51) Int. Cl.
*G06K 9/00* (2006.01)

(52) U.S. Cl. .................. 382/165; 382/228
(58) Field of Classification Search ......... 382/162–167, 382/224–228, 199–203, 168–170
See application file for complete search history.

(56) References Cited

U.S. PATENT DOCUMENTS

| 5,642,443 | A | | 6/1997 | Goodwin et al. | |
|---|---|---|---|---|---|
| 5,822,453 | A | * | 10/1998 | Lee et al. | 382/169 |
| 5,889,578 | A | | 3/1999 | Jamzadeh | |
| 5,901,245 | A | | 5/1999 | Warnick et al. | |
| 6,097,470 | A | * | 8/2000 | Buhr et al. | 355/38 |
| 6,282,317 | B1 | * | 8/2001 | Luo et al. | 382/203 |
| 6,408,103 | B1 | * | 6/2002 | Gallagher et al. | 382/260 |
| 6,504,951 | B1 | * | 1/2003 | Luo et al. | 382/165 |
| 6,654,507 | B1 | * | 11/2003 | Luo | 382/282 |

FOREIGN PATENT DOCUMENTS

EP   1 017 019 A   7/2000

OTHER PUBLICATIONS

Szummer et al., Indoor–Outdoor Image Classification, *MIT Media Laboratory Perceptual Computing Section Technical Report No. 445*, IEEE International Workshop, Jan. 1998, pp. 1–10.
Vailaya et al., On Image Classification: City vs Landscape, *IEEE International Workshop on Content–based Access of Image and Video Database*, 1998.
Smith et al., Decoding Image Semantics Using Composite Region Templates, *IEEE Technical Workshop on Content–based Access of Image and Video Database*, 1998, pp. 9–13.
Saber et al., Automatic Image Annotation Using Adaptative Color Classification, *Graphical Models and Image Processing*, vol. 58, No. 2, Mar. 1996, pp. 115–126.
U.S. Appl. No. 09/450,190, filed Nov. 29, 1999 by Luo et al.
Singhal A et al: "A Multilevel Bayesian Network Approach to Image Sensor Fusion", Proceedings of the Third International Conference on Information Fusion, (Cat No. 00EX438) Int. Soc. Inf. Fusion Sunnydale, CA, USA, vol. 2, Jul. 10, 2000 pages WEB3/9–16, vol. 2, XP010505068, ISBN: 2-7257-0001-9 * the whole document*.

* cited by examiner

*Primary Examiner*—Jingge Wu
(74) *Attorney, Agent, or Firm*—Thomas H. Close

(57) ABSTRACT

Disclosed is a method for detecting subject matter regions in a digital color image having pixels of (red, green, blue) values, comprising the steps of: assigning to each pixel a belief value as belonging to the subject matter region based on color and texture features; forming spatially contiguous candidate subject matter regions by thresholding the belief values; analyzing the spatially contiguous regions based on one or more unique characteristics of the subject matter to determine the probability that a region belongs to the subject matter; and generating a map of detected subject matter regions and associated probability that the regions belongs to the subject matter.

32 Claims, 6 Drawing Sheets

METHOD FOR DETECTING SUBJECT MATTER REGIONS IN IMAGES

FIELD OF THE INVENTION

The invention relates generally to the field of digital image processing and digital image understanding, and more particularly to a system for detecting subject matter regions, such as cloudy and overcast sky, grass, sand, snow, and standing water, in photographic and other similar images.

BACKGROUND OF THE INVENTION

Photographs contain a wide variety of subject matters. Examples of primary, most frequently seen subject matters are sky, grass, sand, snow, and so on. Sky is among the most important subject matters frequently seen in photographic images. Detection of sky can often facilitate a variety of image understanding, enhancement, and manipulation tasks. Sky is a strong indicator of an outdoor image for scene categorization (e.g., outdoor scenes vs. indoor scenes, picnic scenes vs. meeting scenes, city vs. landscape, etc.). See, for example M. Szummer and R. W. Picard, "Indoor-Outdoor Image Classification," in *Proc. IEEE Intl. Workshop on Content-based Access of Image and Video Database*, 1998 and A. Vailaya, A. Jain, and H. J. Zhang, "On Image Classification: City vs. Landscape," in *Proc. IEEE Intl. Workshop on Content-based Access of Image and Video Database*, 1998 (both of which are incorporated herein by reference). With information about the sky, it is possible to formulate queries such as "outdoor images that contain significant sky" or "sunset images" etc. (e.g., see J. R. Smith and C.-S. Li, "Decoding Image Semantics Using Composite Region Templates," in *Proc. IEEE Intl. Workshop on Content-based Access of Image and Video Database*, 1998, incorporated herein by reference). Thus, sky detection can also lead to more effective content-based image retrieval.

The most prominent characteristic of sky is its color, which is usually light blue when the sky is clear. In the case of cloudy or overcast skies, there is a larger variation in sky color. However, even for cloudy and overcast skies, the sky regions tend to be the brightest regions in an image. Unlike clear sky, cloudy or overcast sky tend to contain higher level texture information. Sky color has been used to detect clear sky in images. For example, U.S. Pat. No. 5,889,578 issued Mar. 30, 1999 to Jamzadeh (which is incorporated herein by reference), mentions the use of color cue ("light blue") to detect sky without providing further description.

U.S. Pat. No. 5,642,443, issued Jun. 24, 1997 to Goodwin (which is incorporated herein by reference), uses color and (lack of) texture to indicate pixels associated with sky in the image. In particular, partitioning by chromaticity domain into sectors is utilized by Goodwin. Pixels with sampling zones along the two long sides of a non-oriented image are examined. If an asymmetric distribution of sky colors is found, the orientation of the image is estimated. The orientation of a whole order of photos is determined based on estimates for individual images in the order. For the whole order orientation method in Goodwin to be successful, a sufficiently large group of characteristics (so that one with at least an 80% success rate is found in nearly every image), or a smaller group of characteristics (with greater than a 90% success rate—which characteristics can be found in about 40% of all images) is needed. Therefore, with Goodwin, a very robust sky detection method is not required.

In a work by Saber et al. (E. Saber, A. M. Tekalp, R. Eschbach, and K. Knox, "Automatic Image Annotation Using Adaptive Color Classification", CVGIP: *Graphical Models and Image Processing*, vol. 58, pp. 115–126, 1996, incorporated herein by reference), color classification was used to detect sky. The sky pixels are assumed to follow a 2D Gaussian probability density function (PDF). Therefore, a metric similar to the Mahalonobis distance is used, along with an adaptively determined threshold for a given image, to determine sky pixels. Finally, information regarding the presence of sky, grass, and skin, which are extracted from the image based solely on the above-mentioned color classification, are used to determine the categorization and annotation of an image (e.g., "outdoor", "people").

Recognizing that matching natural images solely based on global similarities can only take things so far. Therefore, Smith, supra, developed a method for decoding image semantics using composite regions templates (CRT) in the context of content-based image retrieval. With the process in Smith, after an image is partitioned using color region segmentation, vertical and horizontal scans are performed on a typical 5×5 grid to create the CRT, which is essentially a 5×5 matrix showing the spatial relationship among regions. Assuming known image orientation, a blue extended patch at the top of an image is likely to represent clear sky, and the regions corresponding to skies and clouds are likely to be above the regions corresponding to grass and trees. Although these assumptions are not always valid, nevertheless it was shown in Smith, supra, that queries performed using CRTs, color histograms and texture were much more effective for such categories as "sunsets" and "nature".

The major drawback of conventional techniques for subject matter detection is that they cannot identify primary subject matters, such as cloudy and overcast sky reliably, because of the lack of consideration of unique characteristics of the subject matters. Furthermore, some of these techniques have to rely on the a priori knowledge of the image orientation. Failure to reliably detect the presence of primary subject matters, in particular false positive detection, may lead to failures in the downstream applications (e.g., falsely detected sky regions may lead to incorrect inference of image orientation). Therefore, there is a need for a more robust primary subject detection method.

SUMMARY OF THE INVENTION

The need is met by providing a method for detecting subject matter regions in a digital color image having pixels of (red. green, blue) values. This is accomplished by the steps of assigning to each pixel a belief value as belonging to the subject matter region based on color and texture features, forming spatially contiguous candidate subject matter regions by thresholding the belief values, analyzing the spatially contiguous regions based on one or more unique characteristics of the subject matter to determine the probability that a region belongs to the subject matter, and generating a map of detected subject matter regions and associated probability that the regions belong to the subject matter.

ADVANTAGES OF THE INVENTION

One advantage of the present invention lies in the utilization of physics-based unique characteristics of primary subject matters in addition to color and texture features. In the case of sky detection, by using color and texture features followed by region-based analysis, the method in the present invention is not likely to be fooled by other similarly colored subject matters such as walls and clothing. Further, the inventive region extraction process automatically determines an appropriate threshold for the subject matter belief values. By utilizing the unique characteristics in combination with color and texture filters, the invention produces results which are superior to conventional systems.

DETAILED DESCRIPTION OF THE INVENTION

Figure 1:
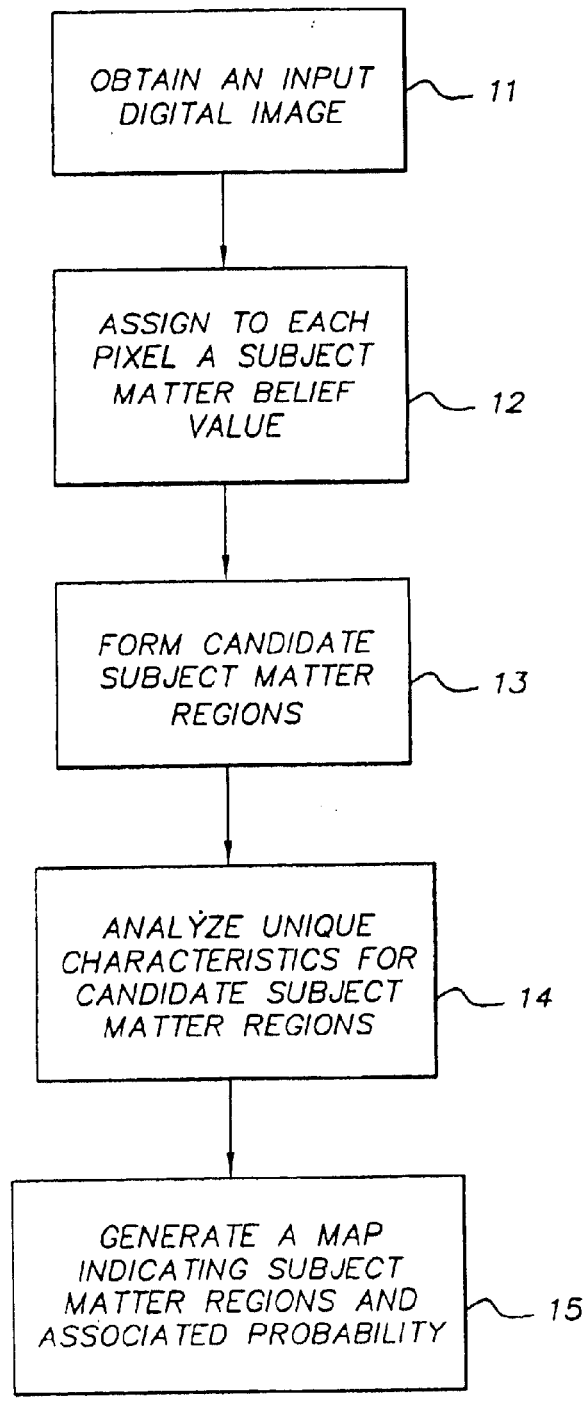
FIG. 1 is a flowchart describing the processing steps of the present invention.

A flowchart illustrating the basic method of the present invention is shown in FIG. 1. There is shown a method for detecting subject matter regions in a digital color image having pixels of (red, green, blue) values. First, a digital color image is obtained 11. Then, the image is processed by a classifier, which assigns 12 to each pixel a belief value as belonging to the subject matter region based on a plurality of color and texture features. Next, spatially contiguous candidate subject matter regions are formed 13 by thresholding the belief values using a pre-determined threshold followed by connected component labeling. The spatially contiguous candidate regions are analyzed 14 based on one or more unique characteristics of the subject matter to determine the probability that a region belongs to the subject matter. Finally, a map is generated 15 to indicate detected subject matter regions and associated probabilities that the regions belong to the subject matter. In a preferred embodiment of the present invention, an adaptive thresholding method is utilized to reject candidate sky regions with low sky belief values.

The collection of subject matter belief values for all pixels obtained in step 12 are used to produce a subject matter belief map for the input image. The subject matter belief map is thresholded to create a binary map such that each pixel is designated as either belonging to the subject matter or not belonging to the subject matter. Using this binary map, it is then possible to form spatially contiguous candidate subject matter regions. In a preferred embodiment of the present invention, the thresholding process is accomplished using an image-dependent adaptive thresholding algorithm, such that the subject matter belief threshold is customized for the particular image. Conventionally, a fixed threshold is used for all input images. The major drawback of a fixed threshold is the ignorance of the changing statistics in individual images due to changes in image content and imaging condition.

Figure 2:
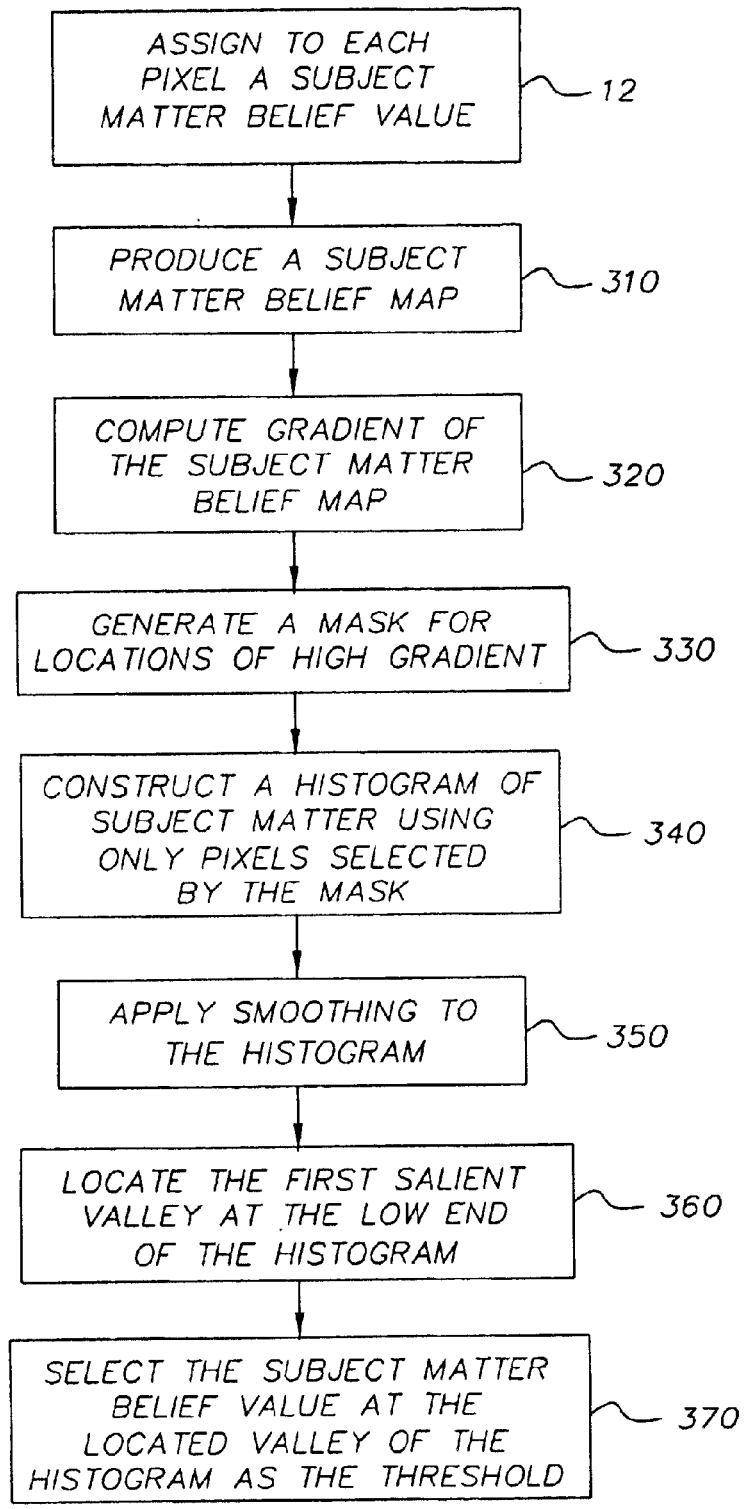
FIG. 2 is a flowchart describing the processing steps of an adaptive thresholding method used in the present invention.

The determination of the adaptive threshold is more completely described in FIG. 2. After a subject matter belief value is assigned 12 to each pixel in the image, a subject matter belief map is produced 310 where the value of each pixel represents the corresponding subject matter belief value. The gradient of the subject matter belief map is computed 320. The gradient of an image f(x,y) at location (x,y) is defined as $$\nabla f = [G_x, G_y] = \left[\frac{\partial f}{\partial x}, \frac{\partial f}{\partial y}\right]^T \quad (1)$$

and its digital forms are two separable kernels:

$$G_x = \begin{bmatrix} 1 & 0 & -1 \\ 2 & 0 & -2 \\ 1 & 0 & -1 \end{bmatrix} \quad G_y = \begin{bmatrix} 1 & 0 & -1 \\ 2 & 0 & -2 \\ 1 & 0 & -1 \end{bmatrix} \quad (2)$$

The magnitude of the gradient vector is $$G = [G_x^2 + G_y^2]^{1/2} \approx |G_x| + |G_y| \quad (3)$$

A mask is generated 330 to indicate those pixels having gradient magnitude values greater than 400. Then, a histogram of subject matter belief values is constructed 340 using only those pixels with high gradient values. The main advantage of using only the pixels with high gradient values is that they generally correspond to the pixels around boundaries of subject matter regions. Consequently, the histogram generally exhibits distinctive peaks and valleys because the pixels around subject matter region boundaries have either high or low subject matter probability values. Smoothing is applied to the histogram 350 to reduce the effect of noise. Next, the first distinctive valley, starting from the low value end of the histogram, is located 360 between two peaks. The subject matter belief value at the located valley of the histogram is selected 370 as the threshold. Pixels with higher subject matter belief values than the threshold are considered subject matter pixels while all others are considered non subject matter pixels.

More specifically, the present invention can take the form of a method, image recognition system, computer program, etc., for detecting cloudy and overcast sky regions in an image and comprises classifying potential sky pixels in the image. In a preferred embodiment of the present invention, sky detection comprises identifying all the pixels in an image that correspond to the unoccluded part of the sky. Furthermore, sky detection assigns each individual segmented region a probability that it contains sky. It is left to the subsequent conventional processing of the image understanding system to either utilize the probability representation or convert it into a crisp decision.

Figure 3:
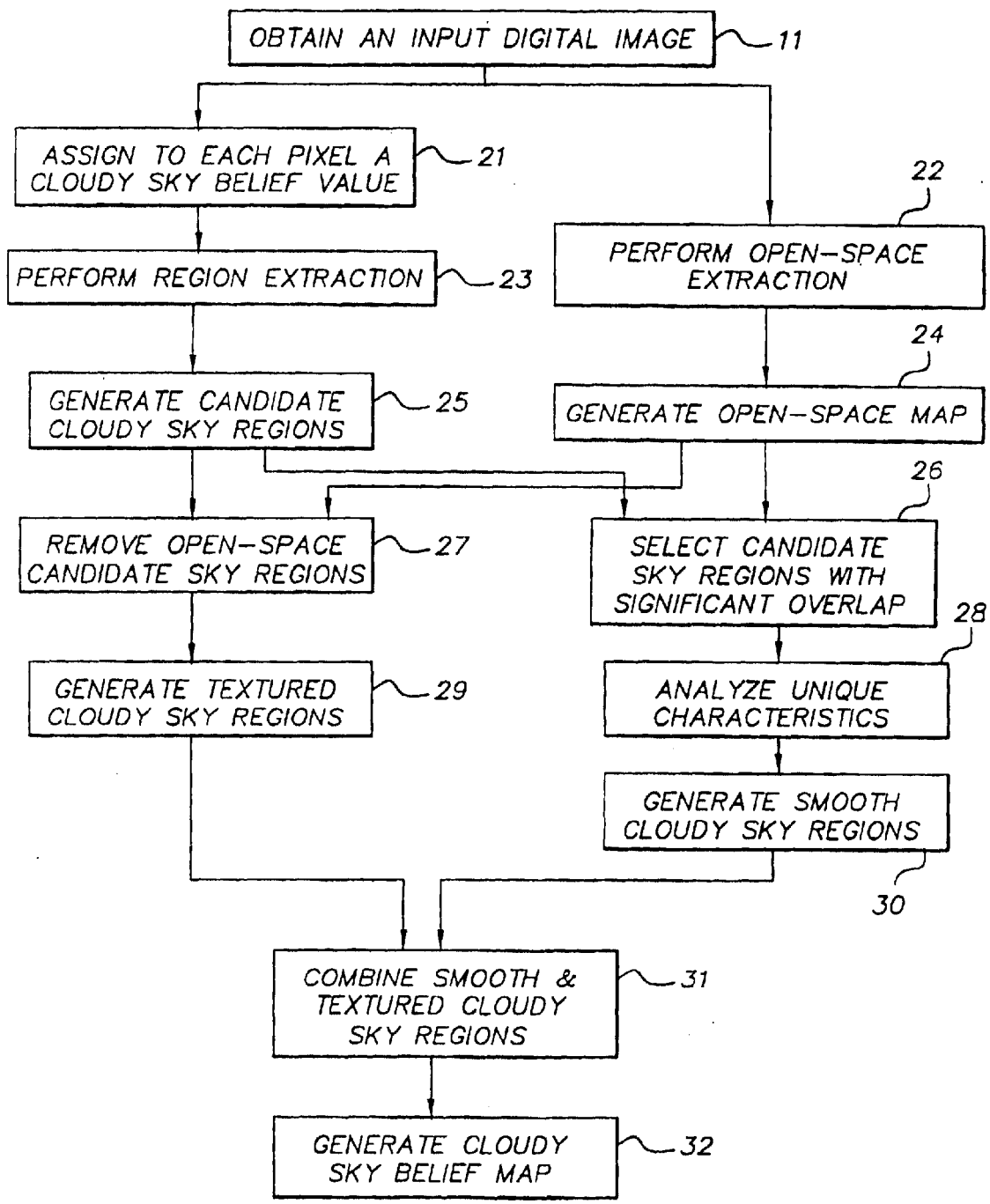
FIG. 3 is a flowchart describing the processing steps of the present invention when used for cloudy sky detection.

FIG. 3 shows a preferred embodiment of the present invention for cloudy sky detection. First, an input color digital image 11 is processed by a color and texture pixel classification step 21 based on color and texture features by a suitably trained multi-layer neural network. The result of the pixel classification step is that each pixel is assigned a belief value as belonging to cloudy sky. Next, a region extraction step 23 is used to generate a number of candidate cloudy sky regions 25. At the same time, the input image is processed by an open-space detection step 22 to generate an open-space map 24. Candidate regions that have overlap with the regions in the open-space map are processed separately from those that have no overlap with the regions in the open-space map. In one branch of the processing, only non open-space candidate sky regions are selected 27, and these candidate regions will be labeled as textured cloudy sky regions 29. In another branch of the processing, only candidate regions with significant (.e.g., greater than 80%) overlap with any region in the open-space map will be retained 26 for further processing. These retained candidate regions are analyzed 28 for unique characteristics. Only those candidate regions that exhibit these unique characteristics are labeled as smooth cloudy sky regions 30.

The correspondence between FIG. 1 and FIG. 3 is as follows. Step 11 of FIG. 3 is the same as Step 11 of FIG. 1. Step 21 of FIG. 3 corresponds to Step 12 of FIG. 1. Steps 23 and 25 of FIG. 3 correspond to Step 13 of FIG. 1. Steps 22, 24, 26, 27 and 28 of FIG. 3 correspond to Step 14 of FIG. 1. Steps 29–32 of FIG. 3 correspond to Step 15 of FIG. 1.

Figure 4:
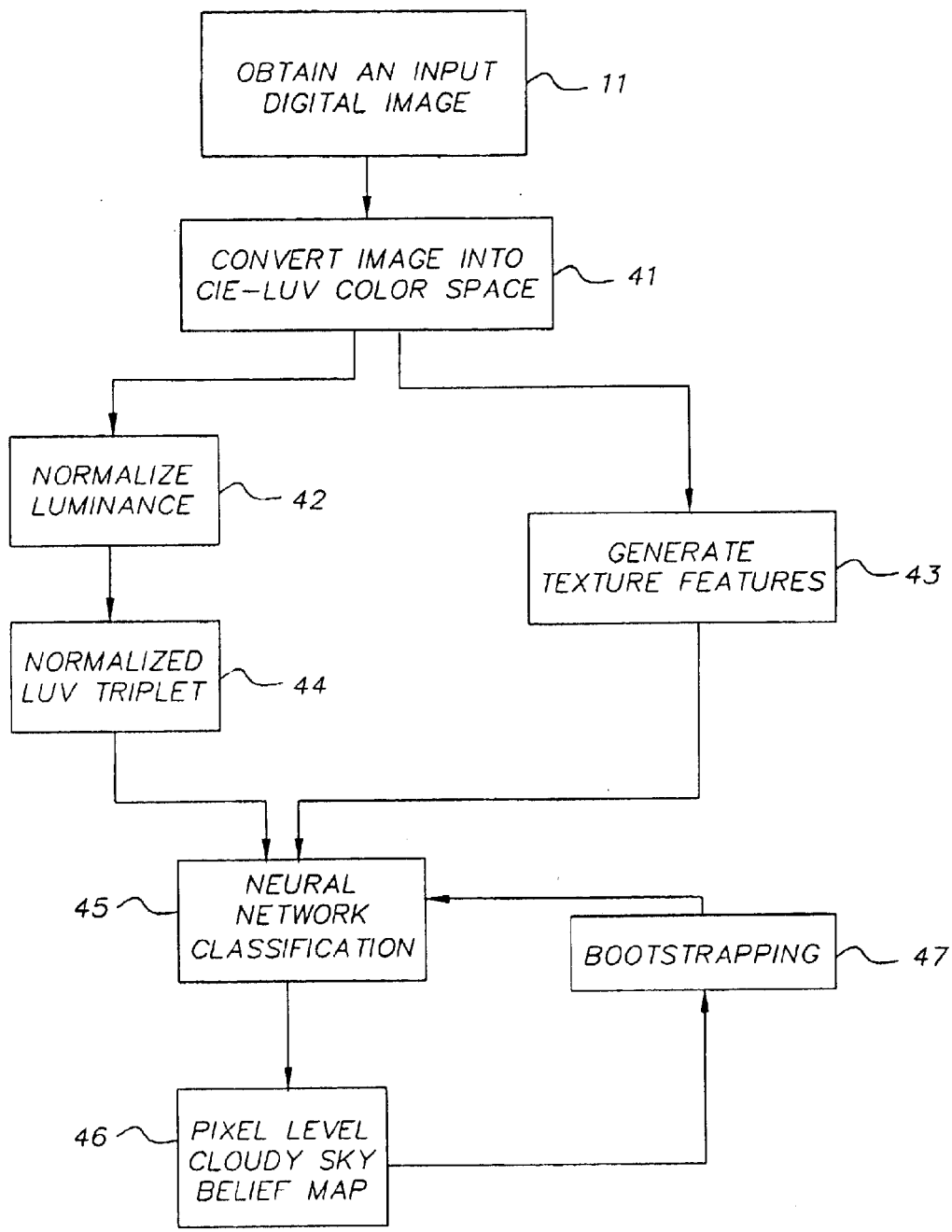
FIG. 4 is a flowchart describing the processing steps of feature calculation used by the present invention for cloudy sky detection.

The color and texture pixel classification step 21 is shown in FIG. 4 in more detail. First, an input color digital image is obtained 11 and converted into a luminance-chrominance color space 41 (such as the well-known and standardized CIE-LUV color space). Observations show that sky regions (blue or cloudy/overcast) tend to be the brightest regions in an image because sky is almost always the main source of illumination in outdoor scenes. The LUV color space allows us to take advantage of this observation. A normalization step 42 is used to defined a normalized luminance feature l' on a per image basis:

$$l' = l/\max_l l \qquad (4)$$

where l is the raw luminance value. This physics-motivated feature extraction step leads to significant reduction in false positive detection of other grayish colored subject matter such as roads and walls. The normalized LUV triplet 44 for each pixel provides the three color features for the neural network classifier. The texture features are computed 43 from the raw luminance value using a wavelet transform based on multiresolution analysis.

Multiresolution analysis (MRA) refers to the process of decomposing a signal into a hierarchy of coarse approximations and detail coefficients. The signal can be reconstructed perfectly from the coarse approximations and detail functions by combining scaling and filtering operations. The filtering operations incorporate a low-pass filter h(n) and high-pass filter g(n) related by:

$$g(n) = (-1)^n h(1-n) \qquad (5)$$

If h(n) and g(n) are chosen such that they satisfy further mathematical conditions, the MRA is a wavelet decomposition. Using h(n) and g(n), a two-dimensional separable wavelet implementation can be obtained as follows:

$$LL(i, j) = h(i)h(j), LH(i, j) = h(i)g(j),$$

$$HL(i, j) = g(i)h(j), HH(i, j) = g(i)g(j) \qquad (6)$$

where LL(ij) are the coarse approximation coefficients, LH(i,j), HL(i,j), and HH(i,j) are the detail coefficients, and i and j denote the image coordinates. For the multilevel case, the decomposition is repeated on the LL coefficients.

Figure 5:
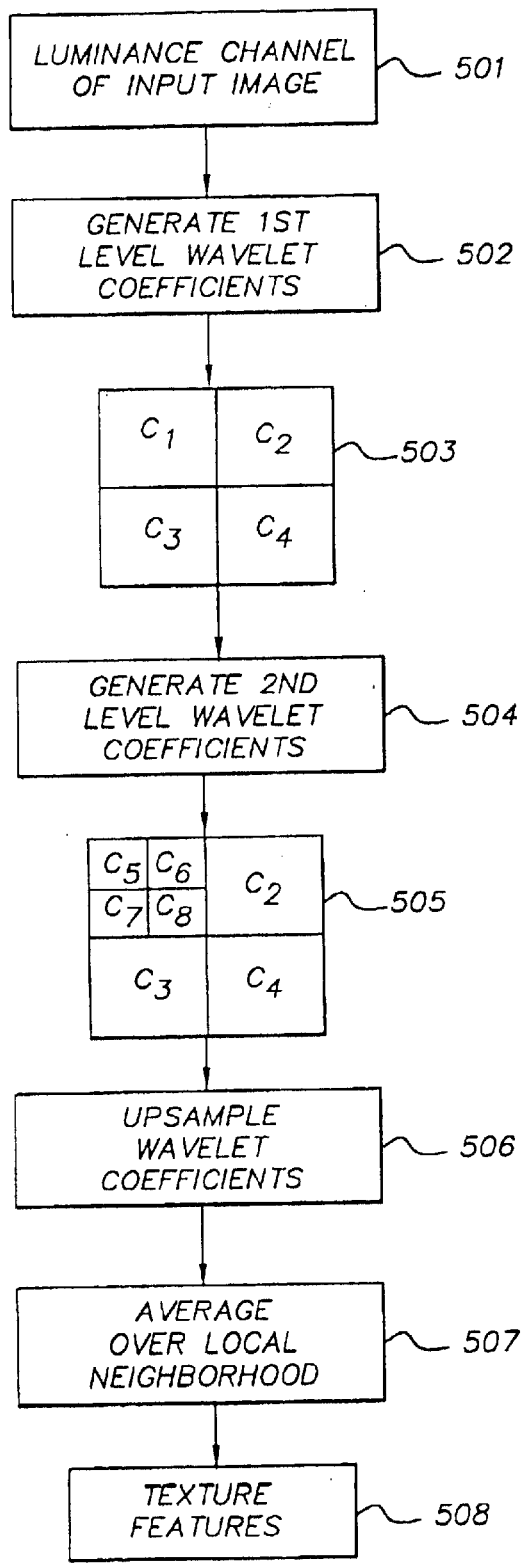
FIG. 5 is a flowchart describing the processing steps of wavelet transform for texture feature calculation used by the present invention for cloudy sky detection.

In a preferred embodiment of the present invention, h(n) and g(n) were implemented using Daubechies' 4-tap wavelet filter coefficients. A two-level wavelet decomposition was performed on the luminance channel, as shown in FIG. 5. First, the raw luminance channel 501 is obtained from the input digital image. Next, the 1st level wavelet coefficients are generated 502. These coefficients are represented by c1, c2, c3, and c4 503. Next, the 2nd level wavelet coefficients are generated from the c1 wavelet band 504. This results in coefficients c5, c6, c7, and c8 505.

To ensure that for every pixel in the original image there is a corresponding pixel in all wavelet sub-bands, the first level coefficients are upsampled by a factor of two and the second level coefficients are upsampled by a factor of four 506. The upsampling is performed via linear interpolation, and we upsample the absolute value of the coefficients. Once the one-to-one correspondence is established, a local wavelet coefficient average is calculated 507 over a 7×7 window. The overall process is akin to computing a local, 7×7, L1-norm at each pixel location (x, y) over all wavelet coefficients, $C_k$:

$$e(x, y) = \frac{1}{49} \sum_{i=x-3}^{x+3} \sum_{j=y-3}^{y+3} |c_k(i, j)|, k = 2, 3, 4, 6, 7, 8 \qquad (7)$$

Those skilled in the art would recognize that it is possible to use over-complete wavelet decomposition instead of upsampling the sub-band coefficients obtained from a standard octave wavelet decomposition. Coefficient c5, which is a measure of the local average of the signal, is ignored because this property is captured by the use of the luminance color feature. Coefficients, c2, c3, c4, c6, c7, and c8 are used as cloudy/overcast sky texture predictors. This gives a total of 6 texture features 508 for each pixel.

Referring back to FIG. 4, a trained neural network 45 is used as the classifier for pixel classification 21 after color and texture features are calculated to generate a belief value 46 for each pixel. The neural network can be trained using a mix of 50 cloudy sky, 10 blue sky, and 40 non-sky (primarily indoor walls, snow, and water) images. A bootstrapping stage 47 is used (only during the training stage) to retrain the network to reduce the number of false positives and false negatives (misses). The neural network generates a pixel level map 46 that associates each pixel with a belief value in that pixel being a cloudy/overcast sky pixel. This pixel level belief map 46 is converted into a region-based belief map 25 using an inventive adaptive thresholding and connected components process 23 as described next (see FIG. 3).

The region extraction step 23 will now be described in more detail. More specifically, the inventive region extraction process automatically determines an appropriate threshold for the sky color belief map by finding the first valley point encountered moving from lower beliefs to higher beliefs in the belief histogram, and then performs a connected component analysis. In addition, with the invention, the connected components are refined to produce candidate cloudy sky regions, which facilitates unique characteristics validation that is otherwise impossible at the pixel level.

For a belief map, where the value of each pixel is proportional to the belief value of that pixel having a sky color and texture, a global threshold is determined in an adaptive fashion, as discussed previously. A binary map is created using this threshold, whereas a "1" pixel is considered as a candidate sky pixel and a "0" pixel is considered as a non-sky pixel. Connected components, which are regions of spatially contiguous "1" pixels, are uniquely labeled to produce spatially separated nonzero regions of sky color and texture. Note that non-sky pixels are labeled to "0" (referred to herein as "unlabeled") regardless of their connectivity. Connected components of sky color and texture are candidate cloudy sky regions 25 for further analysis.

In a preferred embodiment of the present invention, an inventive region growing process is used to fill in holes and extend boundaries of the candidate cloudy sky regions. This is especially useful where "marginal" pixels may have sky-color and texture belief values that barely fail the global threshold but are close enough to the belief values of the neighboring pixels that have passed the initial global threshold. With the invention, a "growing threshold" is used to re-label such marginal pixels to a connected component if the difference in belief values between an "unlabeled" pixel and its neighboring "labeled" pixel is smaller than a second threshold for region growing. More specifically, seed regions are created by taking the intersection between pixels with supra-threshold belief values and the connected components in the open-space map. For pixels with sub-threshold belief values, region growing is guided by the continuity in belief values as well as continuity in color values. Small, isolated sky regions are ignored.

In a preferred embodiment of the invention, an open-space detection step 22 (described in U.S. Pat. No. 5,901,245 issued May 4, 1999 to Warnick et al. incorporated herein by reference) is employed to select regions of low activity. The automatic open-space detection process is based on two separate stages of operation. First, after a proper color space transformation is performed, a gradient-based activity map is computed and a proper threshold is determined according to a multi-region histogram analysis. In the second stage, a connected component analysis is performed on the binary activity map to fill voids and small regions are discarded. Open space detection is incorporated to: (1) separate connected candidate regions that belong to different objects; and (2) enable validation of unique characteristics of cloudy sky within candidate sky regions.

An open-space map 24 is produced, which typically contains one or more completely bounded sub-regions of an image whose color and spatial properties appear visually uniform. These sub-region boundaries may have either a regular or irregular shape.

In one branch of the processing, only candidate regions with significant (e.g., greater than 80%) overlap with any region in the open-space map will be retained 26 for further processing. In general, overcast sky regions, grass lawn, snow field, sand field, or a body of standing water, appear as low activity regions in an image. An intersection of the pixel belief map generated in the color and texture classifying step with the open-space map is used to reject pixels corresponding to inhomogeneous distribution of belief values in low activity regions.

The retained candidate regions are further analyzed 28 for unique characteristics. Only those cloudy sky candidate regions 25 that exhibit these unique characteristics are labeled as smooth cloudy sky regions 30. One good example of such unique characteristics is the de-saturation effect of clear blue sky towards horizon, which appears as a color gradient of deep blue to lighter blue (or even completely white, described in detail in the co-pending U.S. application Ser. No. 09/450,190). The characteristics of cloudy sky are less unique, but in general include smoothness, specific location (near top of the images and in contact with image borders), etc.

In the meantime, candidate cloudy sky regions 25 that contains fair amounts of texture are labeled as textured cloudy sky regions 29. This is accomplished by labeling non open-space candidate sky regions 27.

As shown above, a robust cloudy and overcast sky detection process can be built using color and texture classification followed by analysis of the resulting regions based on open-space maps to eliminate false positive regions and extract only true cloudy and overcast sky regions. Specifically, an open-space model of the cloudy and overcast sky is desirable, if possible, to differentiate true sky regions from other similarly colored and textured subject matters. It is also possible for cloudy sky regions to not have an open-space model as cloudy skies can have texture content. Therefore, the open-space map is used largely to eliminate false positives such as water bodies, walls, and clothing. The final sky belief map is generated by combining non-sparse open-space regions (that represent cloudy and overcast sky with low texture content) and candidate sky regions that have no corresponding open-space model (representing cloudy sky regions with texture content). The embodiment described below provides a robust sky detection process that differentiates true sky regions from other similarly colored and textured subject matters.

The final steps in the cloudy/overcast sky process involve combining 31 the textured candidate cloudy sky regions 29 with those open-space regions 30 that are detected as candidate cloudy sky regions and exhibit a belief distribution that matches the model for true cloudy skies. A final cloudy sky map 32 is produced to indicate the location, extent, and associated probability of detected sky regions.

Given the effectiveness of the inventive sky signature validation process, it is possible to relax the color and texture classification stage to include other shades of the sky, such as the shades at sunset or sunrise. In contrast to overcast sky at daylight, cloudless sky at sunset or sunrise exhibits similar scattering effect as the counterpart during the day. The main difference is the warm color tint from the rising or setting sun.

As mentioned above, the invention utilizes unique characteristics resulting from the physical model of the cloudy sky based on the completeness of the belief value distribution in the corresponding open-space map (resulting from homogeneity in true cloudy/overcast sky regions). By using unique characteristics (as opposed to pure color or texture features), the method of the present invention is not likely to be fooled by other similarly colored subject matters such as bodies of water, walls, and clothing. Further, the inventive region forming process automatically determines an appropriate threshold for the cloudy sky belief values. The present invention produces results that are superior to conventional systems.

Still more specifically, the invention can take the form of a method, image recognition system, computer program, etc., for detecting lawn grass regions in an image and comprises classifying potential grass pixels in the image by color and texture, extracting connected components of the potential grass pixels to form spatially contiguous candidate regions, eliminating candidate regions that have an insufficient amount of overlap or intersection with regions of low activity (open-space), and using adaptive thresholding to identify true lawn grass regions in the image.

Figure 6:
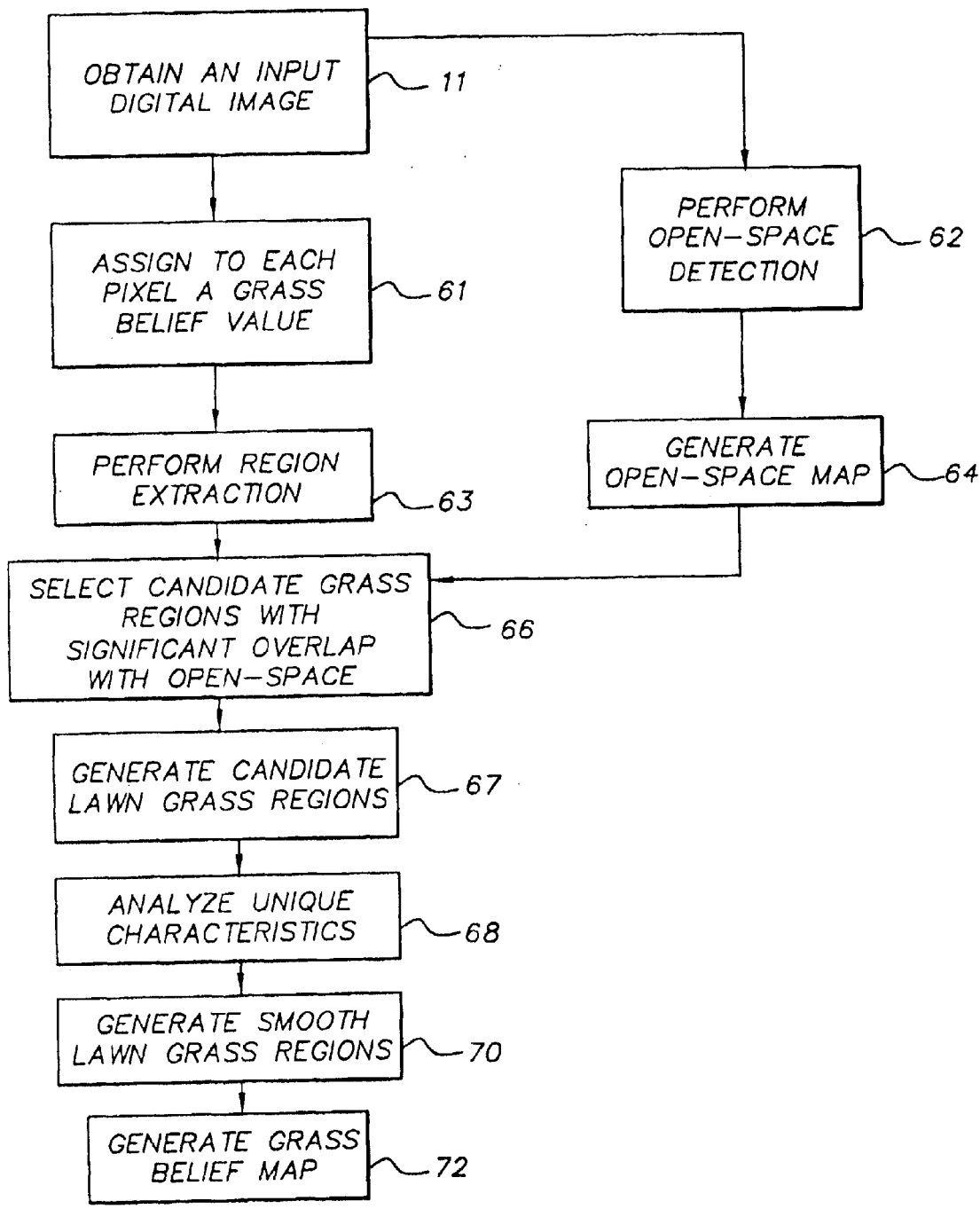
FIG. 6 is a flowchart describing the processing steps of the present invention when used for grass detection.

Referring to FIG. 6, there is shown a block diagram of a method for detecting lawn grass, which is similar to but not completely the same as that for cloudy sky detection (FIG. 3). First, an input color digital image 11 is processed by a pixel classification step 61 using a neural network based on color and texture features. In a preferred embodiment of the present invention, the color and texture features are computed in a similar manner to those computed for cloudy sky detection. The result of the pixel classification step is that each pixel is assigned a belief value as belonging to grass. Next, a region extraction step 63 is used to generate a number of candidate grass regions. At the same time, the input image 11 is processed by an open-space detection step 62 to generate an open-space map 64. Candidate regions with significant (e.g., greater than 80%) overlap with any region in the open-space map will be selected 66 to generate a list of candidate lawn grass regions 67. These retained candidate regions are analyzed 68 for unique characteristics.

The characteristics of grass are less unique, but in general include having light and isotropic texture, having specific location (near bottom of the images and in contact with image borders), etc. Only those candidate regions that exhibit these unique characteristics are labeled as smooth lawn grass regions 70. A grass belief map is generated 72, indicating the location and extent, as well as the associated belief values of detected grass regions.

Those skilled in art would recognize that the method of the present invention could be extended without departing from the scope of the present teachings. For example, the present invention can be readily extended to detecting other primary subject matters including snow, sand, standing water, etc.

For recognizing the orientation of an image, knowledge of sky and its orientation may indicate the image orientation for outdoor images (contrary to a common belief, a sky region is not always at the top of an image). Further, in detecting main subjects in the image, sky regions can usually be excluded because they are likely to be part of the background.

Still further, image classification (e.g., indoor or outdoor, city or rural), album page making (e.g., picnic, beach, etc.), image retrieval (e.g., images with similar sky or similar grass lawn) can be performed according to the subject matters found within an image.

The subject matter of the present invention relates to digital image understanding technology, which is understood to mean technology that digitally processes a digital image to recognize and thereby assign useful meaning to human understandable objects, attributes or conditions, and then to utilize the results obtained in the further processing of the digital image.

The present invention may be provided as a computer program product. A computer program product may include one or more storage medium, for example: magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

While the invention has been described in terms of preferred embodiments, those skilled in the art will recognize that the invention can be practiced with modification within the spirit and scope of the appended claims.

PARTS LIST

11 obtain color image step
12 classify pixel step
13 form regions step
14 analyze region step
15 generate region map step
21 pixel classification step
22 detect open space step
23 extract region step
24 generate open space map step
25 generate candidate sky regions step
26 select candidate sky regions step
27 select sky regions step
28 analyze regions step
29 label textured sky region step
30 label smooth sky region step
31 combine sky regions step
32 sky map
41 convert color space step
42 normalize luminance step
43 compute texture features
44 normalized LUV triplet
45 neural network
46 pixel belief value
47 bootstrapping step
61 pixel classification step
62 detect open space step
63 extract region step
64 generate open-space map step
66 select candidate region step
67 list of candidate regions
68 analyze candidate region step
70 label smooth grass regions step
72 generate grass belief map
310 produce pixel belief map step
320 compute gradient step
330 generate mask step
340 construct histogram step
350 smooth histogram step
360 locate histogram valley step
370 select threshold step
501 obtain raw luminance channel step
502 generate wavelet coefficients step
503 wavelet coefficients
504 generate wavelet coefficients step
505 wavelet coefficients
506 upsample step
507 calculate wavelet coefficient average step
508 texture features

What is claimed is:

1. A method for detecting subject matter regions in a digital color image having pixels of (red, green, blue) values, comprising the steps of:
   a) assigning to each pixel a belief value as belonging to the subject matter region based on color and texture features;
   b) forming spatially contiguous candidate subject matter regions by thresholding the belief values;
   c) analyzing the spatially contiguous regions based on one or more unique characteristics of the subject matter to determine the probability that a region belongs to the subject matter; and
   d) generating a map of detected subject matter regions and associated probability that the regions belongs to the subject matter.

2. The method claimed in claim 1, wherein the subject matter is cloudy or overcast sky and step of analyzing the spatially contiguous regions includes the steps of:
   c1) computing an open space map containing spatially contiguous regions of low activity;
   c2) comparing the spatially contiguous regions of low activity with the spatially contiguous candidate subject matter regions;
   c3) labeling those candidate regions that have significant overlap with the low activity regions as subject matter regions; and
   c4) labeling those candidate regions that do not have any overlap with the low activity regions as subject matter regions.

3. The method claimed in claim 1, wherein the subject matter is cloudy sky and step of assigning to each pixel a belief value includes the steps of:
   a1) calculating one luminance value and two chrominance values from the (red, green, blue) values of each pixel in the digital color image;

a2) calculating a normalized luminance feature as a ratio of the luminance value and a maximum luminance value of the entire digital color image; and a3) calculating two chrominance features as equal to the two chrominance values.

4. The method claimed in claim 1, wherein the step of assigning to each pixel a belief value includes the steps of:

a1) calculating a luminance value from (red, green, blue) values of each pixel in the digital color image; and a2) calculating a plurality of texture features using the luminance values.

5. The method claimed in claim 4, wherein the texture features are coefficients derived from a wavelet transform based on multiresolution analysis of the digital color image.

6. The method claimed in claim 1, wherein the step of forming spatially contiguous candidate subject matter regions by thresholding the belief values includes the steps of:

b1) producing a subject matter belief map using subject matter belief values of all the pixels in the image;

b2) computing gradient values from the subject matter belief map;

b3) selecting pixels having gradient values greater than a predetermined value;

b4) forming a histogram of subject matter belief values using only the selected pixels from the previous step;

b5) locating a valley point in the histogram; and b6) determining the subject matter belief threshold as the subject matter belief value at the located valley point of the histogram.

7. The method claimed in claim 1, wherein the subject matter is lawn grass, snow field, sand or standing water and step of analyzing the spatially contiguous regions includes the steps of:

c1) computing an open space map containing spatially contiguous regions of low activity;

c2) comparing the spatially contiguous regions of low activity with the spatially contiguous candidate subject matter regions; and c3) labeling those candidate regions that have significant overlap with the low activity regions as subject matter regions.

8. The method claimed in claim 2, wherein the step of assigning the pixel belief value is performed with a trained neural network.

9. The method claimed in claim 7, wherein the step of assigning the pixel belief value is performed with a trained neural network.

10. The method claimed in claim 1, further comprising the step of:

e) performing image classification using the map of detected subject matter regions.

11. The method claimed in claim 1, further comprising the step of:

e) determining image orientation using the map of detected subject matter regions.

12. The method claimed in claim 1, further comprising the step of:

e) automatically generating album pages having similar subject matter using the map of detected subject matter regions.

13. The method claimed in claim 1, further comprising the step of:

e) determining a main subject of the image using the map of detected subject matter regions.

14. The method claimed in claim 1, further comprising the step of:

e) determining background of the image using the map of detected subject matter regions.

15. The method claimed in claim 1, further comprising the step of:

e) retrieving images having similar subject matter from an image data base using the map of detected subject matter regions.

16. The method claimed in claim 1, further comprising the step of:

e) selectively compressing the image using the map of detected subject matter regions.

17. A system for detecting subject matter regions in a digital color image having pixels of (red, green, blue) values, comprising:

a) means for assigning to each pixel a belief value as belonging to the subject matter region based on color and texture features;

b) means for forming spatially contiguous candidate subject matter regions by thresholding the belief values;

c) means for analyzing the spatially contiguous regions based on one or more unique characteristics of the subject matter to determine the probability that a region belongs to the subject matter; and d) means for generating a map of detected subject matter regions and associated probability that the regions belongs to the subject matter.

18. The system claimed in claim 17, wherein the subject matter is cloudy or overcast sky and the means for analyzing the spatially contiguous regions includes:

c1) means for computing an open space map containing spatially contiguous regions of low activity;

c2) means for comparing the spatially contiguous regions of low activity with the spatially contiguous candidate subject matter regions;

c3) means for labeling those candidate regions that have significant overlap with the low activity regions as subject matter regions; and c4) means for labeling those candidate regions candidate regions that do not have any overlap with the low activity regions as subject matter regions.

19. The system claimed in claim 17, wherein the subject matter is cloudy sky and the means for assigning to each pixel a belief value includes:

a1) means for calculating one luminance value and two chrominance values from the (red, green, blue) values of each pixel in the digital color image;

a2) means for calculating a normalized luminance feature as a ratio of the luminance value and a maximum luminance value of the entire digital color image; and a3) means for calculating two chrominance features as equal to the two chrominance values.

20. The system claimed in claim 17, wherein the means for assigning to each pixel a belief value includes:

a1) means for calculating a luminance value from (red, green, blue) values of each pixel in the digital color image; and a2) means for calculating a plurality of texture features using the luminance values.

21. The system claimed in claim 20, wherein the texture features are coefficients derived from a wavelet transform based on multiresolution analysis of the digital color image.

22. The system claimed in claim 17, wherein the means for forming spatially contiguous candidate subject matter regions by thresholding the belief values includes:

b1) means for producing a subject matter belief map using subject matter belief values of all the pixels in the image;

b2) means for computing gradient values from the subject matter belief map;

b3) means for selecting pixels having gradient values greater than a predetermined value;

b4) means for forming a histogram of subject matter belief values using only the selected pixels from the previous step;

b5) means for locating a valley point in the histogram; and b6) means for determining the subject matter belief threshold as the subject matter belief value at the located valley point of the histogram.

23. The system claimed in claim 17, wherein the subject matter is lawn grass, snow field, sand, or standing water and the means for analyzing the spatially contiguous regions includes:

c1) means for computing an open space map containing spatially contiguous regions of low activity;

c2) means for comparing the spatially contiguous regions of low activity with the spatially contiguous candidate subject matter regions; and c3) means for labeling those candidate regions that have significant overlap with the low activity regions as subject matter regions.

24. The system claimed in claim 17, wherein the means for assigning the pixel belief value is a trained neural network.

25. The system claimed in claim 23, wherein the means for assigning the pixel belief value is a trained neural network.

26. The system claimed in claim 17, further comprising:

e) means for performing image classification using the map of detected subject matter regions.

27. The system claimed in claim 17, further comprising:

e) means for determining image orientation using the map of detected subject matter regions.

28. The system claimed in claim 17, further comprising:

e) means for automatically generating album pages having similar subject matter using the map of detected subject matter regions.

29. The system claimed in claim 17, further comprising:

e) means for determining a main subject of the image using the map of detected subject matter regions.

30. The system claimed in claim 17, further comprising:

e) means for determining background of the image using the map of detected subject matter regions.

31. The system claimed in claim 17, further comprising:

e) means for retrieving images having similar subject matter from an image data base using the map of detected subject matter regions.

32. The system claimed in claim 17, further comprising:

e) means for selectively compressing the image using the map of detected subject matter regions.

* * * * *